2 Sheets—Sheet 1.

O. GSANTNER.

ELEVATED RAILWAY.

No. 3,329. Reissued Mar. 16, 1869.

WITNESSES.
Alex T. Roberts
Wm A Morgan.

INVENTOR
Otto Gsantner.
per Munn & Co
attys.

THE NORRIS PETERS CO., PHOTO-LITHO., WASHINGTON, D. C.

O. GSANTNER.

ELEVATED RAILWAY.

No. 3,329. Reissued Mar. 16, 1869.

WITNESSES.
Alex B. Roberts.
Anna Morgan.

INVENTOR
Otto Gsantner.
per Munn & Co
attys.

THE NORRIS PETERS CO., PHOTO-LITHO., WASHINGTON, D. C.

United States Patent Office.

OTTO GSANTNER, OF EAST ORANGE, NEW JERSEY.

*Letters Patent No.* 83,772, *dated November* 3, 1868; *reissue No.* 3,329, *dated March* 16, 1869.

IMPROVED ELEVATED RAILWAY.

The Schedule referred to in these Letters Patent and making part of the same.

*To all whom it may concern:*

Be it known that I, OTTO GSANTNER, of East Orange, in the county of Essex, and State of New Jersey, have invented a new and improved Elevated Railway; and I do hereby declare that the following is a full, clear, and exact description t' ereof, which will enable others skilled in the art to make and use the same, reference being had to the accompanying drawings, forming part of this specification.

This invention relates to a new and improved elevated railway, designed for streets and roads, and more especially for cities or other places or routes where there is considerable travel.

In the accompanying sheet of drawings—

Figure 1:
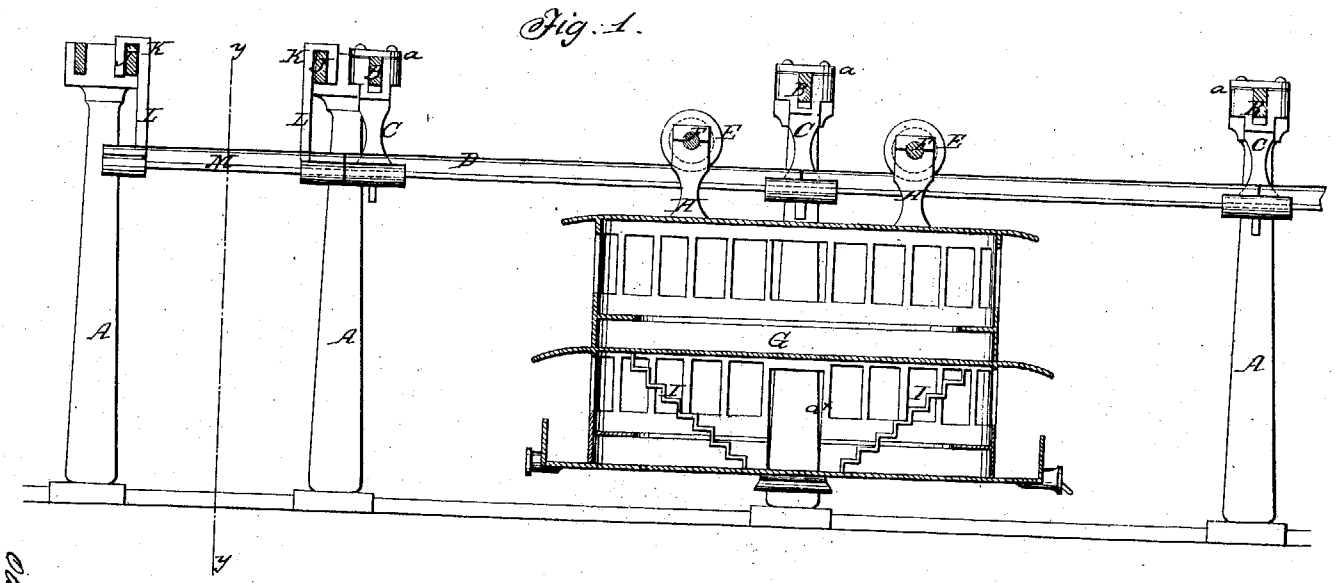
Figure 2:
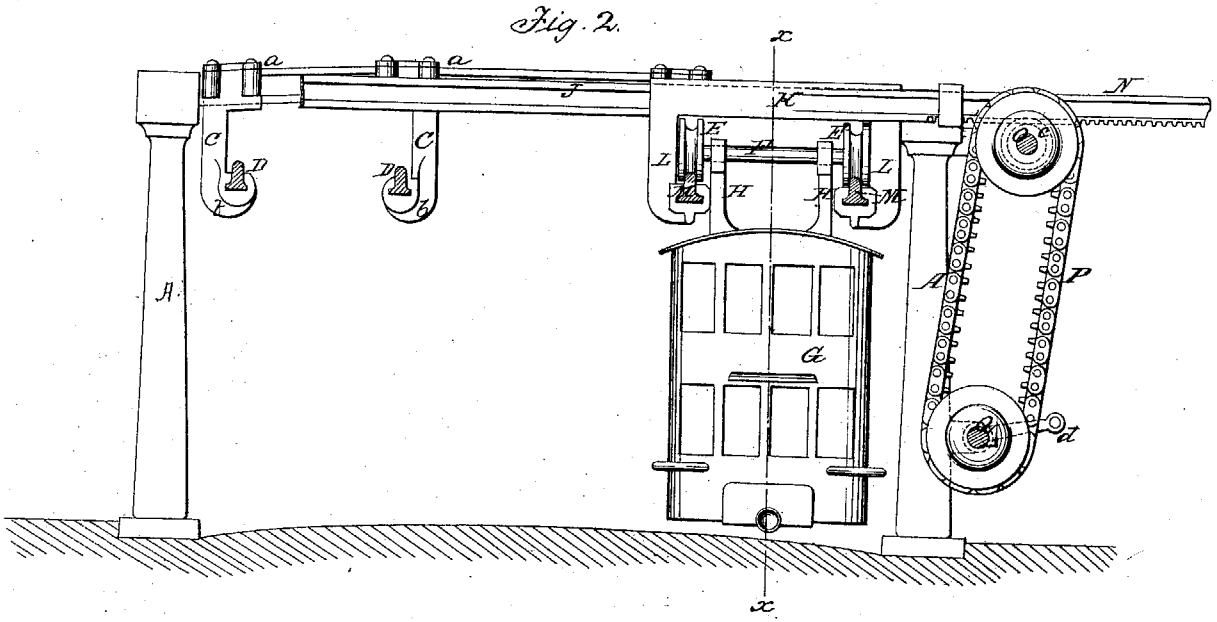

Figure 1, Sheet No. 1, is a side sectional view of my invention, taken in the line *x x*, fig. 2.

Figure 2, a transverse section of the same, taken in the line *y y*, fig. 1.

Similar letters of reference indicate corresponding parts.

A represents a series of columns, or pillars, which may be of cast-iron, and placed at suitable distances apart at each side of the street, or road, at the edges of the sidewalks, near the curb-stones.

The upper ends of these columns are connected by transverse bars B, slightly curved, or arched.

On these bars B there is firmly secured, by clamps *a*, arranged in any proper way, a series of hangers, C, which support the rails D.

It will be seen that the hangers are readily movable, when desired or necessary.

It is designed, in practice, to have two or more tracks, suspended from the transverse bars B, as shown in fig. 2.

The lower ends of the hangers C are curved, as shown in fig. 2, at *b*, and these curved portions receive the rails D, the latter being at such a distance from the vertical portions of the hangers to admit of the car-wheels E passing the same, as shown clearly in fig. 2.

The curved portion of the hangers forms the bed for the rails, which will be embedded therein. No spikes or other fastenings are necessary to retain said rails in place.

It will be seen that by this arrangement a very strong and durable framing is obtained to hold the cars in a suspended state, the rails D and the tranverse bars B serving as braces, to permit a lateral strain, or pressure upon the columns A, in any direction.

The car-wheels E have grooved peripheries, as shown clearly in fig. 2, and said wheels are keyed firmly on their axles F.

By this means the rails D are prevented from spreading laterally.

The car G is suspended, by hangers H, from the axles F, and it is designed to have the rails D at such an elevation as to admit of two-story cars being used, and to have the bottoms of the cars clear the surface of the street, leaving about a foot space underneath.

The doors *a*× of the car are at its sides, and the upper story is reached by stairs I I.

The conductor's place is at the centre of the car, where he can see every passenger that enters and leaves the car, and collect the fare from every passenger.

In ordinary street-car travel, many fares are lost by the indiscriminate jumping on and off of passengers at the front and rear platforms of the cars.

This car may be drawn by horses attached in the usual way, or it may be drawn by a dummy-engine.

At the end of the route, the car is moved from one track to the other by the following means:

Two transverse rails, J J, are secured to columns A, on which rails there are placed slides K K, provided with hangers L, constructed precisely like the hangers H, and on which hangers L, at their lower parts, rails M are secured.

By moving the slides K K on these rails J J, the rails M may be brought in line with either of the two tracks of the road.

Different plans may be devised for moving the rails M M. The one shown in fig. 2, consists of a rack, N, attached to one of the slides K, and having a pinion, *e*, on a shaft, O, gearing into it. (See dotted lines, fig. 2.)

The movable hangers for the rails have many advantages, among which may be mentioned—

When it is desired to place the tracks nearer to or further from each other; where there are obstructions in the street, or when there are building-operations, the tracks may require shifting nearer to the middle, or one track altogether dispensed with.

This shaft O is rotated by a belt or chain, P, from a shaft, Q, which is sufficiently low to be turned by a crank, *d*, by a person standing on the street, or ground.

I design to have brakes applied to the cars, constructed and arranged in such a manner as to act against the wheels. This arrangement would be preferable, as, the car-wheels E being of small diameter, brakes of considerable power would be required, in order to be efficient in acting against the wheels.

I would remark that branch-roads and turnouts may be used with or applied to this elevated road, without any trouble or difficulty whatever.

I would further remark that the device employed for moving the slides K, to adjust the cars from one track to the other, should be suppled with a lock, in order that it may not be tampered with or operated by persons not authorized to do so.

Having thus described my invention,

What I claim as new, and desire to secure by Letters Patent, is—

1. The hangers C and the bed for the rails formed in one piece, in combination with the embedded rail, substantially as and for the purpose described.

2. The hangers C made movable, as and for the purpose described.

3. The sliding hangers L, with rails M for shifting the suspended cars from one track to the other, as represented and described.

OTTO GSANTNER.

Witnesses:

HENRY SAUERBIER,
GEORGE LUDERSON.